UNITED STATES PATENT OFFICE.

HENRY A. GARDNER, OF WASHINGTON, DISTRICT OF COLUMBIA.

PROCESS OF MAKING BARIUM CHLORID.

1,146,491. Specification of Letters Patent. Patented July 13, 1915.

No Drawing. Application filed January 20, 1915. Serial No. 3,380.

*To all whom it may concern:*

Be it known that I, HENRY A. GARDNER, a citizen of the United States, residing at Washington, in the District of Columbia, have invented certain new and useful Improvements in Processes of Making Barium Chlorid, of which the following is a specification.

This invention relates to processes of making barium chlorid, the object being to provide a process whereby barium chlorid may be prepared from barium sulfate and calcium chlorid, with higher yields than have heretofore been obtainable.

It is known that when barium sulfate and calcium chlorid are heated in substantially molecular proportions, a certain amount of barium chlorid is formed according to the reaction:—

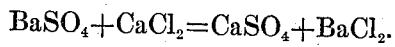

The reaction is however incomplete; and moreover, when it is attempted to extract the barium chlorid by water, the calcium sulfate dissolves progressively, and a reaction tends to occur in the reverse sense, viz.:

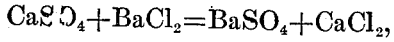

whereby the yields are greatly diminished.

I have discovered that by heating a mixture of barium sulfate and calcium chlorid in approximately molecular proportions to full fusion, and until a certain proportion of the $SO_3$ is driven off, there is formed a basic melt which does not display the same tendency to a reversal of the reaction when brought into presence of water. Under these conditions, the original reaction also proceeds further with the results that the yields of barium chlorid are very largely increased.

The following examples illustrate this. In all cases, equimolecular mixtures of barium sulfate and calcium chlorid were used, and the extraction of the barium chlorid and the filtration of the solution from the undissolved residue was accomplished as quickly as practicable:—

Example I: The mixture was heated to about 800° C., or as nearly as possible to the fusing point, then cooled, ground and extracted with water. There was no substantial evolution of sulfur trioxid. The yield of barium chlorid was 45.30 per cent. of the theoretical amount.

Example II: The mixture was heated to full fusion, or about 900° C. The loss of sulfur trioxid was five per cent. of the total $SO_3$ content of the mixture, and the yield of barium chlorid was 56.50 per cent. of the theoretical.

Example III: The mixture was maintained in fusion for 15 minutes at about 1100° C. The loss of $SO_3$ was not determined. The yield of barium chlorid was approximately 70 per cent. of the theoretical.

Example IV: The mixture was maintained in fusion for 30 minutes at about 1200° C. The loss of sulfur trioxid was 30 per cent. of the total $SO_3$ content, and the yield of barium chlorid was approximately 80 per cent.

Instead of cooling and grinding the melt as above described, the fused mass may be poured directly into water, whereby it is instantly cooled and granulated, and the insoluble portions separated either by settling or filtration. The clear solution of barium chlorid thus obtained yields on evaporation commercially pure crystals.

I claim:—

1. The process of making barium chlorid, which consists in heating a mixture containing barium sulfate and calcium chlorid until acid products are evolved and the mixture becomes basic, and then extracting the barium chlorid.

2. The process of making barium chlorid, which consists in maintaining a mixture containing barium sulfate and calcium chlorid in full fusion until acid products are evolved and the melt becomes basic, then cooling the melt and extracting the barium chlorid therefrom by pouring it into water.

3. The process of making barium chlorid, which consists in heating a mixture containing barium sulfate and calcium chlorid to a temperature in excess of 1,000° C., and thereafter extracting barium chlorid from the product.

4. In a process of making barium chlorid, the step which consists in fusing a mixture containing barium sulfate and calcium chlorid, pouring the melt into water, and separating the dissolved barium chlorid from the undissolved residue.

In testimony whereof I affix my signature in presence of two witnesses.

HENRY A. GARDNER.

Witnesses:
C. W. FOWLER,
N. P. LEONARD.